(12) United States Patent
Koike et al.

(10) Patent No.: US 6,442,012 B2
(45) Date of Patent: *Aug. 27, 2002

(54) FUEL HOSE RESIN COUPLING

(75) Inventors: Masaki Koike, Ichinomiya; Shinichi Bito, Ama-gun; Yasushi Miyamoto, Okazaki; Hisatsugu Goto, Nisshin; Takayuki Kato, Aichi-gun, all of (JP)

(73) Assignee: Toyoda Gosei Co., Ltd., Nishikasugai-gun (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,348

(22) Filed: Apr. 7, 1999

(30) Foreign Application Priority Data

Apr. 7, 1998 (JP) .............................. 10-094899

(51) Int. Cl.$^7$ ................................. F16L 11/04
(52) U.S. Cl. ....................... 361/212; 361/215
(58) Field of Search ................. 361/212, 215; 439/190, 191, 192, 194; 285/238–259, 222.2, 222.4

(56) References Cited

U.S. PATENT DOCUMENTS

| | | | | |
|---|---|---|---|---|
| 3,891,290 A | * | 6/1975 | Marshall | 339/15 |
| 3,943,273 A | * | 3/1976 | de Putter | 361/215 |
| 3,982,157 A | * | 9/1976 | Azuma | 317/2 |
| 4,394,705 A | * | 7/1983 | Blachman | 361/215 |
| 4,658,326 A | * | 4/1987 | Clark et al. | 361/215 |
| 5,143,122 A | * | 9/1992 | Adkins et al. | 138/109 |
| 5,164,879 A | * | 11/1992 | Danowski et al. | 361/215 |
| 5,382,359 A | * | 1/1995 | Brandt | 210/243 |
| 5,491,013 A | * | 2/1996 | Holley | 428/40 |
| 5,511,840 A | * | 4/1996 | Allison | 294/64.1 |
| 5,613,524 A | * | 3/1997 | Martucci | 138/137 |
| 5,855,036 A | * | 1/1999 | Krock | 15/420 |
| 5,931,510 A | * | 8/1999 | Mathew et al. | 285/259 |

FOREIGN PATENT DOCUMENTS

DE  4310159 C2  4/1999
JP  4-224394  8/1992

OTHER PUBLICATIONS

The McGraw–Hill Dictionary of Scientific and Technical Terms, Fifth Edition p. 1962.*
Concise Explanation of JP 04–224394A.
SAE J 1645, Jan. 1999.

* cited by examiner

*Primary Examiner*—Fritz Fleming
(74) *Attorney, Agent, or Firm*—Pillsbury Winthrop LLP

(57) ABSTRACT

A resin coupling connected to a resin fuel hose is provided. An O-ring is fitted in the inner cylindrical wall of the pipe inserting section of a coupling body. The electrical resistance of the coupling body meets $10^6$ to $10^{10}$ Ω·cm in volume resistivity, or $10^6$ to $10^{10}$ Ω in surface resistivity.

8 Claims, 2 Drawing Sheets

FUEL HOSE RESIN COUPLING

CROSS REFERENCE TO RELATED APPLICATIONS

The present application is based on Japanese Patent Application No. Hei. 10-94899, which is incorporated herein by reference.

BACKGROUND OF THE INVENTION

1. Field of the Invention

This invention relates to a coupling mechanism structured to connect a resin fuel hose with a metal pipe, and more particularly to a coupling mechanism including a resin coupling body having a pipe inserting section configured to permit the metal pipe to be inserted thereinto which is designed so that an O-ring can be fitted in an inner wall of the pipe inserting section of the coupling body.

In this specification, the term "electrical deterioration of resin" means that current flows in the contact part of different types of members, so that the resin is deteriorated. An electrical deterioration of the resin may include electrolytic deterioration and thermal (Joule heat) deterioration.

2. Description of Related Art

Japanese Patent Publication No. Hei. 4224394 presents general technical material to this topic level and is herein incorporated by reference.

A resin fuel hose generally requires a compound having characteristics such as resistance to gasoline and gasohol, and gasoline and moisture permeability resistance. Therefore, generally, a hose body 12 is of a multi-layer structure as shown in FIG. 1.

For instance, the resin fuel hose is designed as follows: A body layer 14 is formed of polyamide such as nylon, or the like, having excellent gasohol and moisture permeability resistance, and excellent flexibility. An inner layer (the innermost layer) 16 of fluoro-resin material has much higher gasoline resistance and gasoline permeability resistance than the nylon inside the body layer 14. See, for example, U.S. Pat. No. 5,383,087.

The inner surface of the resin fuel hose may become electrostatically charged by the flow of fuel. Therefore, it is necessary that the amount of electrostatic charge is suppressed to a predetermined value in order to prevent the occurrence of electrostatic trouble.

In order to discharge the static electricity (charge), the quick connector is generally made of a resin which has a volume resistivity lower than $10^6 \Omega \cdot cm$ or a surface resistivity lower than $10^6 \Omega$. If the elctrically conductive quick connector is made of resin, for example, it can be more easily manufactured ( injection molding can be utilized) and will have a reduced weight.

It has been found, however, that the resin quick connector having the above-described electrical resistance also electrically deteriorates more rapidly.

SUMMARY OF THE INVENTION

In view of the foregoing, an object of the invention is to provide a fuel hose resin coupling in which the coupling body has a slow electric deterioration.

The inventors have conducted intensive research on the solution of the above-described problem, and found that the cause for the electrical deterioration of the resin coupling is as follows:

In the discharge path (or charge leak path) of the inner layer 16, the coupling body 24, and the metal pipe 22, a gap which is for the assembling of the metal pipe 22 and the coupling mechanism 18 is provided between the metal pipe 22 and the pipe inserting section 26 of the coupling body 24. The gap between the metal pipe 22 and the pipe inserting section 26 is sealed with O-rings 28. Because of the function of the O-ring 28, its electrical resistance is high enough to prevent the leakage of static electricity. In order to lower the electrical resistance, a large quantity of carbon black is employed to reduce the electrical resistance of the O-ring. However, in order to seal the gap well, it is not suitable to employ a large quantity of carbon black.

Therefore, moving the charge from the inner layer 16 to the coupling body 24 occurs as follows: when the metal pipe 22 is brought into point-contact with the coupling body 24 because of the vibration of the traveling vehicle, current in the form of static electricity flows in the inner layer 16, in the contact part of the coupling body 24 and the metal pipe 22. This current is a factor which expedites the deterioration (or dissolution) of the resin coupling body 24 of resin.

That is, the static electricity generated in the inner layer 16 is removed through a nipple 20 of coupling mechanism 18 and through the metal pipe 22 which is connected to the coupling mechanism 18 and grounded, as shown in FIG. 2

The quick connector 18 is constructed such that O-rings are fitted in the inner cylindrical wall of the pipe inserting section 26 of the coupling body 24. This is to connect the metal pipe to coupling 18 in one action.

In this connection, it has been found that, if the electrical resistance of the coupling body 24 is in a predetermined range, then the current which expedites the deterioration of the coupling body 24 does not flow in the contact part of the coupling body 24 and the metal pipe 22. As a result, the following fuel hose resin coupling has been created.

The coupling mechanism 18 according to the present invention has an O-ring 28 fitted in the inner cylindrical wall of the pipe inserting section 26 of the coupling body 24. A specific feature of the coupling mechanism 18 is that the volume resistivity of the coupling body 24 is within a range of $10^6$ to $10^{10}$ $\Omega \cdot cm$ and the surface resistivity is within a range of $10^6$ to $10^{10}$ $\Omega$.

In this connection, it is preferable that the coupling body 24 has an electrically conductive film 30, because the surface resistivity of the coupling body 24 can be readily set in the above-described range.

In addition, it is preferable that an electrically conductive elastic member 32 is arranged on the bottomed step 27 of the pipe inserting section 26. In this embodiement, it is preferable that each of the volume and surface resistivities of the elastic member 32 is smaller than those of the coupling body 24, because the discharge path is well maintained.

Features and advantages of the invention will be evident from the following detailed description of the preferred embodiments described in conjunction with the attached drawings.

DETAILED DESCRIPTION OF THE PREFERRED EMBODIMENTS

Figure 1:
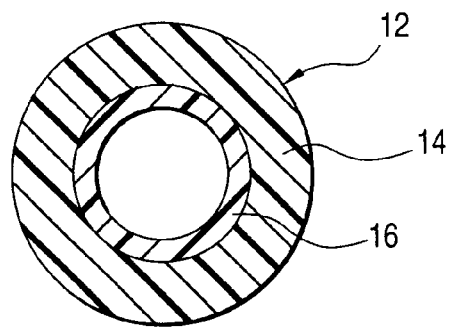
FIG. 1 is a cross sectional view of an example of a fuel hose.
Figure 2:
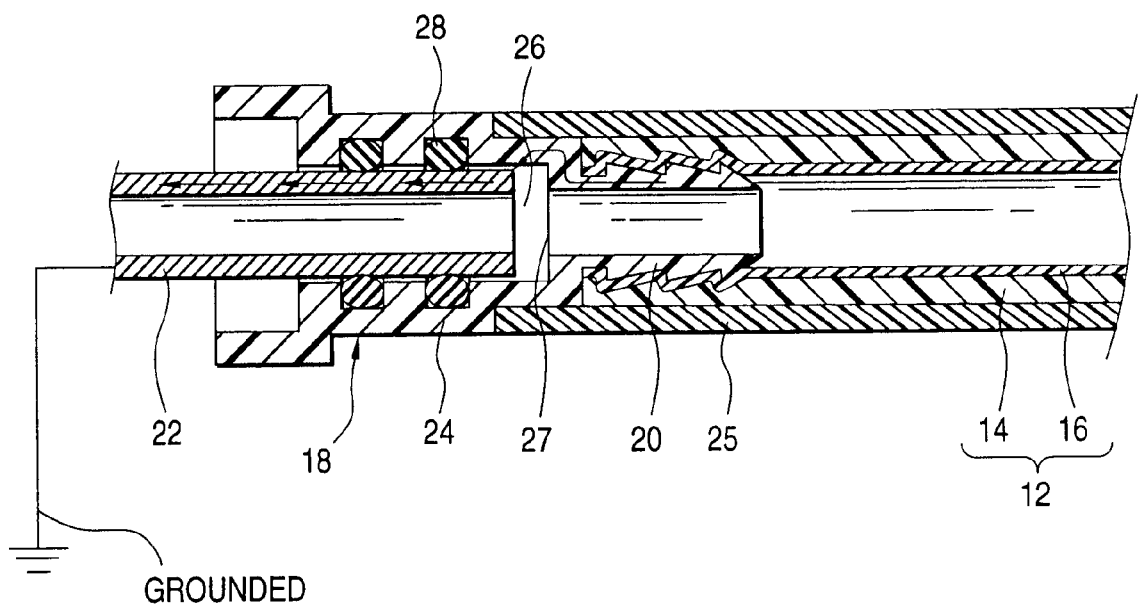
FIG. 2 is a sectional view of an example of a resin coupling, which constitutes an embodiment of the invention.

A coupling mechanism 18 of the invention will be described mainly with reference to FIG. 2.

The coupling mechanism 18 of the invention is connected to a resin fuel hose (or a hose body) 12, and O-rings 28 are fitted in the inner cylindrical wall of the pipe inserting section 26 of the coupling body 24. That is, the coupling mechanism 18 is a quick connector.

In the embodiment shown, the hose body 12 is of a double-layer structure having a body layer 14 and an inner layer 16. However, it should be appreciated that the hose body 12 may be of a single layer structure, or a multi-layer structure consisting of three through six layers. An elastomer hose protector 25 surrounds the hose body 12.

An insulating resin forming the body layer 14 may be any resin which meets characteristics required by the fuel hose. However, it is preferable to employ nylon which has excellent gasohol resistance, flexibility, and low temperature resistance and low water absorption. The inner layer 16 may be formed of an electrically conductive fluoro-resin material.

In the case where the body layer 14 is formed of nylon, and the inner layer 16 is of fluoro-resin, since those materials cannot be connected together by welding, usually an adhesive layer is interposed between the body layer 14 and the inner layer 16.

The volume resistivity of the coupling body 24 is within a range of $10^6$ to $10^{10}$ $\Omega \cdot cm$ (preferably $10^7$ to $10^9$ $\Omega \cdot cm$) and the surface resistivity of the coupling body 24 is within a range of $10^6$ to $10^{10}$ $\Omega \cdot cm$ (preferably $10^7$ to $10^9$ $\Omega$).

If the electrical resistance of the coupling mechanism 18 exceeds the upper limit value, then the electrical resistance is too high to move the static electricity generated inside the hose body 12 through the coupling mechanism 18 to the metal pipe 22. On the other hand, if the electrical resistance of the coupling mechanism 18 is lower than the lower limit value, then a large current flows in the discharge path; that is, the contact of the coupling body 24 and the metal pipe 22, so that, in the coupling mechanism 18, the resin coupling body 24 may deteriorate electrically.

Figure 4:
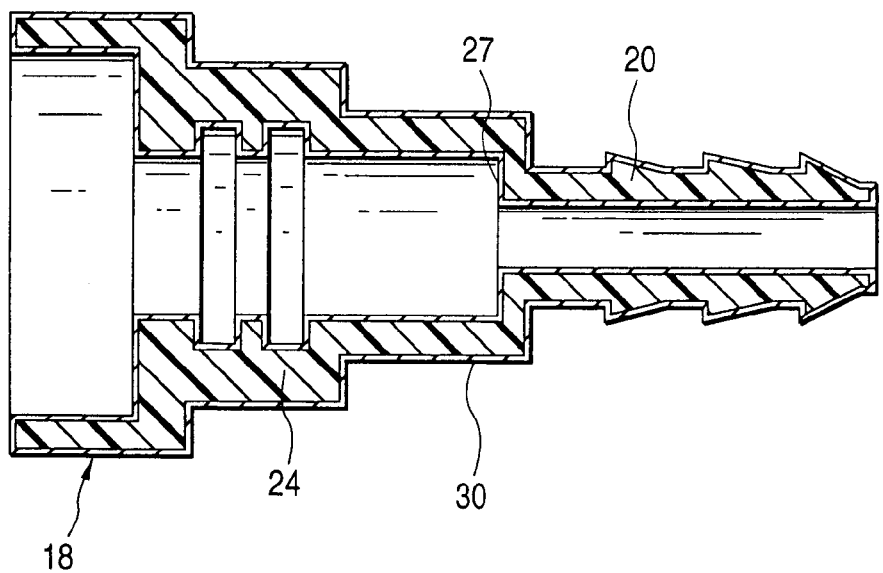
FIG. 4 is a sectional view of the resin coupling on which an electrically conductive film is formed.

The coupling mechanism 18 may have the above-described range of electrical resistance as follows: The resin coupling body 24 may be formed with a hard resin material which is obtained by mixing an electrically conductive filler with hard resin material. Alternatively, as shown in FIG. 4, an electrically conductive film 30 may be formed on the surface of the coupling body 24 which is formed with hard resin material.

Preferably, the hard resin material is polyacetal (POM), polyamide (PA), poly vinyl chloride (PVC), polyester, or polypropylene. Preferably, the electrically conductive filler is carbon black, graphite, or stainless steel, and high electrically conductive metal material such as copper, silver and gold.

The electrically conductive film 30 may be formed by electrically conductive painting coating, electrically conductive ink printing, electrically plating, vacuum evaporating, flame coating, sputtering, or ion plating. However, in view of the productivity, it is preferable to employ the electrically conductive paint coating or electrically conducting ink printing.

The electrically conductive paint/ink is a mixture of electrically conductive filler, and binder such as synthetic resin, solvent and additive which is hardened to form an electrically conductive paint. The electrically conductive filler may be those which have been described above. However, in the case of electrically conductive film, it is preferable that it is carbon black or graphite which is not expensive, because it is not required that the electrically conductive film is high in electrical conductivity.

In addition, it is preferable that the binder, namely, the synthetic resin is high in adhesion with the body layer 14. For instance, in the case where the body layer 14 is made of nylon, it is preferable that the synthetic resin is polyurethane, acrylic resin (including ultraviolet-hardened type), and alkyd resin because they are high in weather resistance.

The surface of the coupling body 24 has the electrically conductive film 30. Therefore, the coupling body 24 having a surface resistivity within a range of $10^6$ to $10^{10}$ $\Omega$ can be readily prepared.

Figure 3:
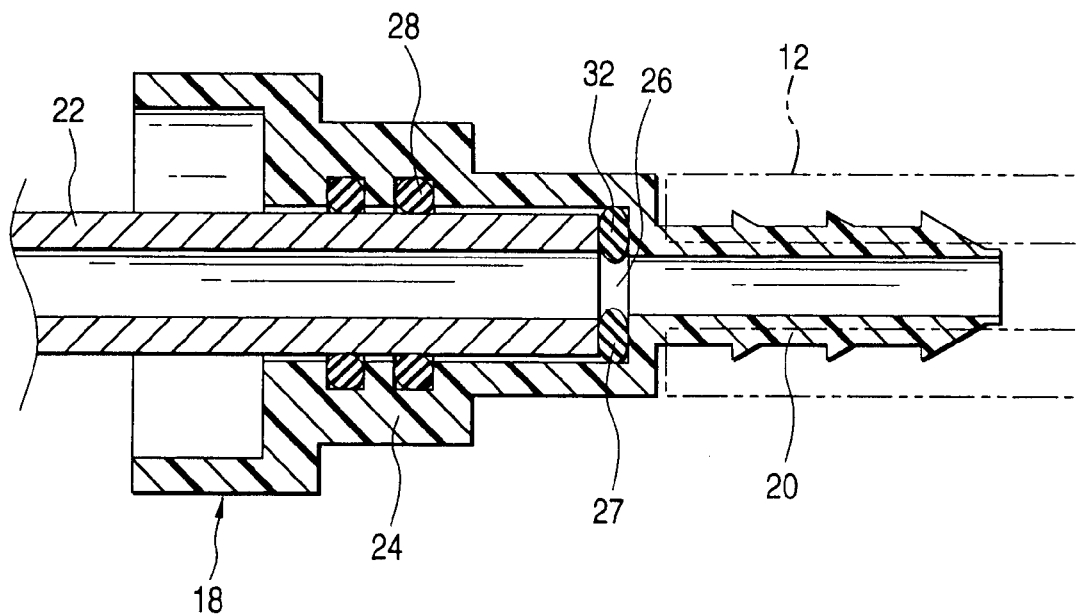
FIG. 3 is a sectional view showing another assembling example of the resin coupling.

As shown in FIG. 3, an electrically conductive elastic member 32 is arranged on the bottomed step 27 of the pipe inserting section 26. Each of the volume and surface resistivities of the elastic member 32 is made smaller than those of the coupling body 24, whereby a direct and stable discharge path can be formed by electrical conduction (including charge movement). Preferably, each of the volume and surface resistivities of the elastic member 32 is set not less than 0.1% and less than 10% of those of the coupling body 24. Therefore, electrical conduction is smoothly carried out from the coupling body 24 to the metal pipe 22; that is no charge is stored in the coupling body 24, and the flow of large current through the contact part of the coupling body 24 and the metal pipe 22 is more positively prevented.

In the embodiment, the elastic member 32 is of electrically conductive rubber; however, the invention is not limited thereto or thereby; that is, it may be a coil spring or leaf spring which is made of metal or electrically conductive hard plastic material.

In the coupling mechanism 18 of the invention, the volume resistivity of the coupling body 24 is within a range of $10^6$ to $10^{10}$ $\Omega \cdot cm$ and the surface resistivity is within a range of $10^6$ to $10^{10}$ $\Omega$. Therefore, the coupling mechanism 18 of the invention has the following functions and effects or merits:

If the electrical resistance of the coupling mechanism 18 exceeds the upper limit value, then the electrical resistance becomes excessively high, so that it becomes difficult for the static electricity generated inside the hose body 12 to move to the metal pipe 22 through the coupling body 24. On the other hand, if the electrical resistance is lower than the lower limit value, a large current flows in the coupling body 24 and the metal pipe 22 in the discharge path, so that the coupling mechanism 18 may be electrically deteriorated. Hence, in the coupling mechanism 18 of the invention, the resin coupling body 24 is scarcely electrically deteriorated.

Furthermore, as the surface of the coupling body 24 may be provided with the electrically conductive film 30, it is readily possible to allow the coupling body 24 to have the above-described surface resistivity.

In the coupling mechanism 18 of the invention, the electrically conductive elastic member 32 is arranged on the bottomed step 27 of the pipe inserting section 26. This feature makes it possible to form a direct and stable discharge path by discharge movement. Hence, electrical conduction is smoothly carried out from the coupling body 24 to the metal pipe 22. Furthermore, the coupling body 24 is not charged. The difficulty can be prevented more positively that a large current flows in the contact part of the coupling body 24 and the metal pipe 22. Therefore, the electrical deterioration of the resin coupling body 24 can be prevented more positively.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A coupling mechanism structured to connect a resin fuel hose and a metal pipe, the coupling mechanism comprising:
    a resin coupling body adapted for insertion into the resin fuel hose and having a pipe inserting section configured to permit the metal pipe to be inserted thereinto;
    at least one O-ring fitted within the pipe inserting section and disposed between the resin coupling body and another portion of the metal pipe; and
    an electrically conductive elastic member having a smaller surface resistivity than that of the resin coupling body and being clamped between said pipe and said coupling body in a longitudinal direction of the coupling mechanism to thereby form a discharging pass of static electricity among the resin coupling body, the elastic member and the metal pipe.

2. A coupling mechanism according to claim 1, wherein volume resistivity of said elastic member is smaller than that of said coupling body.

3. A coupling mechanism according to claim 1, wherein the surface resistivity of the elastic member is less than 10% of the surface resistivity of the resin coupling body.

4. A coupling mechanism according to claim 1, wherein a surface resistivity of the resin coupling body is within a range of $10^6$ to $10^{10}$ $\Omega$.

5. A coupling mechanism according to claim 1, wherein a volume resistivity of the elastic member is less than 10% of a volume resistivity of the resin coupling body.

6. A coupling mechanism according to claim 1, wherein a volume resistivity of the resin coupling body is within a range of $10^6$ to $10^{10}$ $\Omega \cdot cm$.

7. A coupling mechanism structured to connect a resin fuel hose and a metal pipe, the coupling mechanism comprising:
    a resin coupling body adapted for insertion into the resin fuel hose and having a pipe inserting section configured to permit the metal pipe to be inserted thereinto;
    at least one O-ring fitted within the pipe inserting section and disposed between the resin coupling body and another portion of the metal pipe; and
    an electrically conductive elastic member having a smaller volume resistivity than that of the resin coupling body and being clamped between said pipe and said coupling body in a longitudinal direction of the coupling mechanism to thereby form a discharging pass of static electricity among the resin coupling body, the elastic member and the metal pipe.

8. A coupling mechanism according to claim 7, wherein surface resistivity of said elastic member is smaller than that of said coupling body.

* * * * *